US012754714B2

(12) United States Patent
He et al.

(10) Patent No.: US 12,754,714 B2
(45) Date of Patent: Oct. 6, 2026

(54) CONVOLUTION HARDWARE ACCELERATOR

(71) Applicant: Avago Technologies International Sales Pte. Limited, Singapore (SG)

(72) Inventors: Xiaocheng He, San Jose, CA (US); Brian Schoner, Fremont, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 1020 days.

(21) Appl. No.: 17/870,620

(22) Filed: Jul. 21, 2022

(65) Prior Publication Data

US 2024/0028296 A1 Jan. 25, 2024

(51) Int. Cl.
*G06F 7/544* (2006.01)

(52) U.S. Cl.
CPC .................................. *G06F 7/5443* (2013.01)

(58) Field of Classification Search
CPC .. G06F 17/15-153; G06F 17/16; G06F 7/544; G06F 7/5443; G06N 3/0464; G06N 3/04; G06N 3/0475; G06N 3/0495; G06N 3/0499; G06N 3/047
See application file for complete search history.

(56) References Cited

U.S. PATENT DOCUMENTS

2018/0129935 A1* 5/2018 Kim ....................... G06N 3/063
2019/0311243 A1* 10/2019 Whatmough .......... G06N 3/063
2019/0340486 A1* 11/2019 Mills ....................... G06F 17/16
2020/0293867 A1* 9/2020 Shao ...................... G06N 3/045
2022/0188612 A1* 6/2022 Park ....................... G06F 17/153
2022/0269752 A1* 8/2022 Chen ...................... G06F 17/153
2022/0335282 A1* 10/2022 Park ....................... G06N 3/063

OTHER PUBLICATIONS

Hennessy, John L., et al. Computer Architecture : A Quantitative Approach, Elsevier Science & Technology, 2014. ProQuest Ebook Central,http://ebookcentral.proquest.com/lib/uspto-ebooks/detail.action?docID=404052. (Year: 2014).*

* cited by examiner

*Primary Examiner* — Andrew Caldwell
*Assistant Examiner* — Huy Duong
(74) *Attorney, Agent, or Firm* — King Intellectual Asset Management

(57) ABSTRACT

A device includes multiplication and accumulation (MAC) cells, a feature processor circuit, and a weight processor circuit. The feature processor circuit receives, from a memory input units each comprising input feature elements from different respective channels of an input tensor, generates extended feature units each comprising an input feature element from each of the input units and from a common channel of the input tensor, and provides the extended feature units to respective MAC cells. The weight processor circuit receives, from the memory, weight units each comprising weight elements from different respective channels of a kernel, generates extended weight units each comprising a weight element from each of the weight units and from a common channel of the kernel, and provides the extended weight units to respective MAC cells. Each MAC cell is configured to multiply the input feature elements of the extended feature unit provided by the feature processor circuit by the respective weight elements of the extended weight unit provided by the weight processor circuit in parallel and output a sum of the products.

20 Claims, 10 Drawing Sheets

CONVOLUTION HARDWARE ACCELERATOR

TECHNICAL FIELD

The present description relates generally to hardware acceleration including, for example, hardware acceleration for machine learning operations.

BACKGROUND

Computing tasks or operations may be performed using general-purpose processors executing software designed for the computing tasks or operations. Alternatively, computing hardware may be designed to perform the same computing tasks or operations more effectively than the general-purpose processors executing software. Machine learning operations performed in layers of a machine learning model are good candidates for hardware acceleration using computing hardware specifically designed to perform the operations.

BRIEF DESCRIPTION OF THE DRAWINGS

Certain features of the subject technology are set forth in the appended claims. However, for purposes of explanation, several aspects of the subject technology are depicted in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block-diagram form in order to avoid obscuring the concepts of the subject technology.

Machine learning models are used for a wide variety of applications. Convolutional neural networks (CNN) are popular machine learning models in image processing applications, such as applications performing image segmentation, image classification, image recognition, etc. A CNN includes one or more convolution layers configured to convolve an input tensor of input feature elements with a kernel of weight elements to generate an output tensor of output feature elements. Convolution operations include performing a number of multiplication operations repeatedly for different combinations of input feature elements from the input tensor and weight elements from the kernel and summing the products of the multiplication operations to generate the output feature elements in the output tensor. Performance of a CNN may be improved by using a convolution hardware accelerator for a convolution layer to take advantage of the efficiency gains in power consumption and/or speed that a dedicated hardware design can provide relative to a general-purpose processor executing software.

Input tensors, kernels, and output tensors may be single-dimensional or multidimensional arrays of elements. For example, an input tensor, a kernel, and an output tensor may be visualized as three-dimensional arrays of elements, where each element of an array has a corresponding value. An x-axis may correspond to a width of the array, a y-axis may correspond to a height of the array, and a z-axis may correspond to depth or channels of the array. In image processing applications, the width and the height of the array of an input tensor may correspond to the width and the height of an image with each feature element in a width-height plane of the array corresponding to a pixel in the image. The depth of the array may correspond to different channels of pixel values representing the image (e.g., red, green, blue, etc.). The values associated with the elements of the array may be stored in any of a number of integer or floating-point formats (e.g., INT8, UINT8, INT32, FLOAT16, FLOAT32, etc.).

Figure 1:
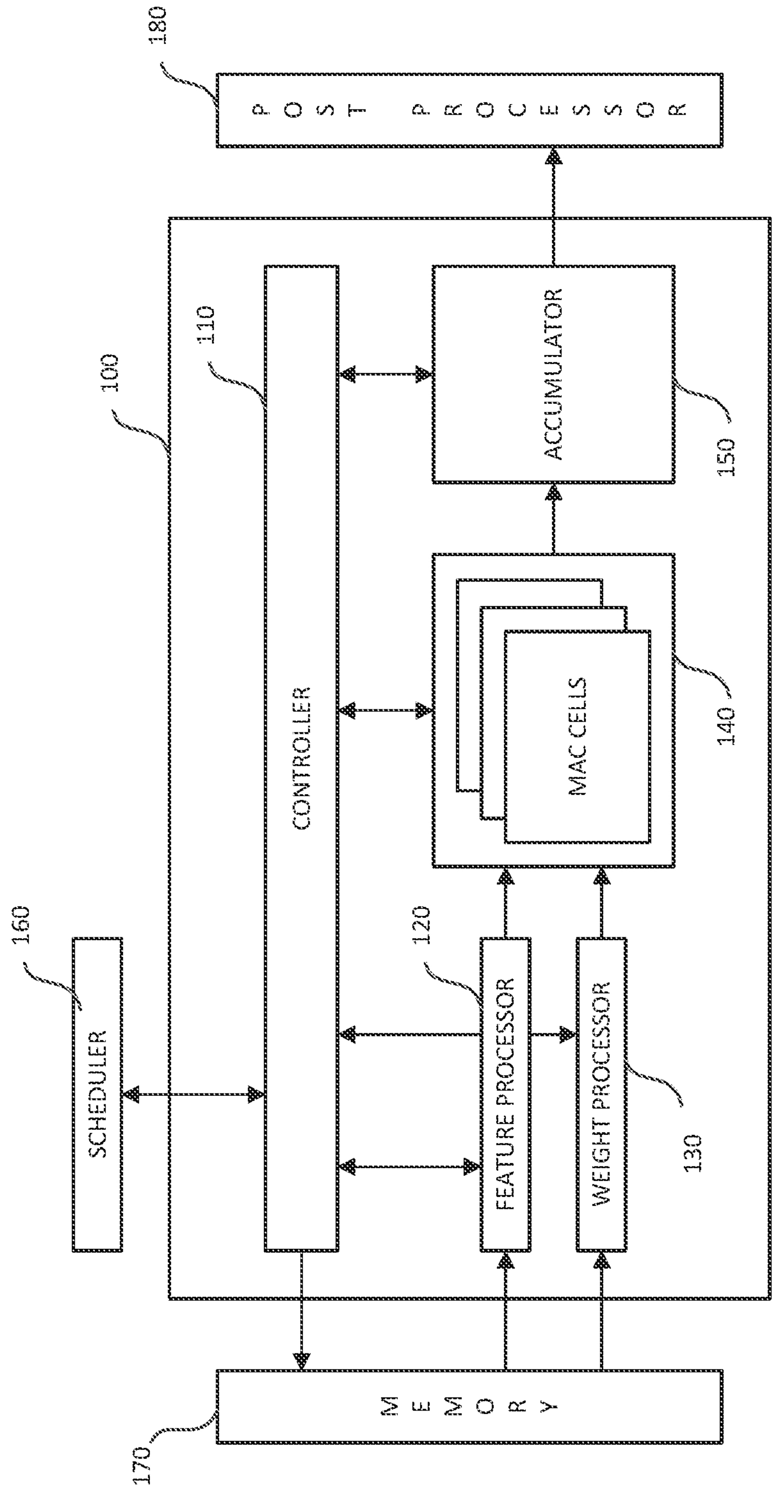
FIG. 1 is a block diagram depicting components of a convolution hardware accelerator device/system according to aspects of the subject technology.

FIG. 1 is a block diagram depicting components of a convolution hardware accelerator device/system according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 1, convolution hardware accelerator device/system 100 includes controller circuit 110, feature processor circuit 120, weight processor circuit 130, multiplication and accumulation (MAC) cells 140, and accumulator circuit 150. All of the components of convolution hardware accelerator device/system 100 may be implemented in a single semiconductor device, such as a system on a chip (SoC). Alternatively, one or more of the components of convolution hardware accelerator device/system 100 may be implemented in a semiconductor device separate from the other components and mounted on a printed circuit board, for example, with the other components to form a system. The subject technology is not limited to these two alternatives and may be implemented using other combinations of chips, devices, packaging, etc. to implement convolution hardware accelerator device/system 100.

Controller circuit 110 includes suitable logic, circuitry, and/or code to control operations of the components of convolution hardware accelerator device/system 100 to convolve an input tensor with a kernel to generate an output tensor. For example, controller circuit 110 may be configured to parse a command written to a command register (not shown) by scheduler 160 for a convolution operation. The subject technology is not limited to any particular type or size of register and may implement the command register using individual flip-flops, latches, static random-access memory (SRAM) modules, etc. The command may include parameters for the convolution operation such a location of the input tensor in memory 170, a location of the kernel(s) in memory 170, a stride value for the convolution operation, etc. Using the parameters for the convolution operation, controller circuit 110 may configure and/or provide commands/instructions to feature processor circuit 120, weight processor circuit 130, MAC cells 140, and accumulator circuit 150 to perform the convolution operation and provide a resulting output tensor to post processor 180. The command register may be incorporated into controller circuit 110 or may be implemented as a separate component accessible to controller circuit 110 within convolution hardware accelerator device/system 100.

Scheduler 160 may be configured to interface with one or more other processing elements not shown in FIG. 1 to coordinate the operations of other layers in a CNN, such as pooling layers, rectified linear units (ReLU) layers, and/or fully connected layers, with operations of a convolutional layer implemented using convolution hardware accelerator device/system 100. The coordination may include timing of the operations, locations of input tensors either received from an external source or generated by another layer in the CNN, locations of output tensors either to use as an input tensor for another layer in the CNN or to be provided as an output of the CNN. Scheduler 160, or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both software and hardware.

Memory 170 may include suitable logic, circuitry, and/or code that enable storage of various types of information such as received data, generated data, code, and/or configuration information. For example, memory 170 may be configured to store one or more input tensors, one or more kernels, and/or one or more output tensors involved in the operations of convolution hardware accelerator device/system 100. Memory 170 may include, for example, random access memory (RAM), read-only memory (ROM), flash memory, magnetic storage, optical storage, etc.

Post processor 180 may be configured to perform one or more post-processing operations on the output tensor provided by convolution hardware accelerator device/system 100. For example, post processor 180 may be configured to apply bias functions, pooling functions, resizing functions, activation functions, etc. to the output tensor. Post processor 180, or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both software and hardware.

As noted above, controller circuit 110 may be configured to parse a command and, using parameters from the command, configure and/or provide commands/instructions to feature processor circuit 120, weight processor circuit 130, MAC cells 140, and accumulator circuit 150 to perform a convolution operation. For example, controller circuit 110 may generate requests for input units each comprising feature elements from an input tensor stored in memory 170 and for weight units each comprising weight elements from a kernel stored in memory 170. The requests may be provided to a direct memory access controller configured to read out the input units from memory 170 and provide the input units to feature processor circuit 120, and to read out the weight units from memory 170 and provide the weight units to weight processor circuit 130.

According to aspects of the subject technology, feature processor circuit 120 includes suitable logic, circuitry, and/or code to receive the input units from memory 170 and distribute the feature elements from the input units among MAC cells 140. Similarly, weight processor circuit 130 includes suitable logic, circuitry, and/or code to receive the weight units from memory 170 and distribute the weight elements from the weight units among MAC cells 140. The operations of feature processor circuit 120 and weight processor circuit 130 are described in more detail below.

According to aspects of the subject technology, MAC cells 140 includes an array of individual MAC cells each including suitable logic, circuitry, and/or code to multiply feature elements received from feature processor circuit 120 by respective weight elements received from weight processor circuit 130 and sum the products of the multiplication operations. The number of MAC cells in the array may be associated with the size and format of the input units and weight units stored in and read from memory 170. For example, each input unit may contain up to a predetermined number of feature elements (e.g., 32) with each feature element having a predetermined size (e.g., 8 bits). Similarly, each weight unit may contain up to a predetermined number of weight elements (e.g., 32) with each weight element having a predetermined size (e.g., 8 bits). The number of elements in each input unit or weight unit may vary for different number formats. For example, the number format used for the element values may be a 16 bit or a 32 bit format, which would result in each unit having up to either 16 elements or 8 elements, respectively. For these examples, MAC cells 140 may include an array of 32 individual MAC cells with each MAC cell including 32 8-bit multipliers coupled to an adder circuit configured to sum the products produced by the multipliers. The subject technology is not limited to these examples and may be implemented with other sizes and formats of input units and weight units, as well as different numbers of MAC cells with different numbers and/or sizes of multipliers in each MAC cell. The operations of MAC cells 140 is described in more detail below.

A convolution operation executed by convolution hardware accelerator device/system 100 may include a sequence of cycles or iterations, where each cycle or iteration involves multiplying different combinations of feature elements from an input tensor with different combinations of weight elements from a kernel and summing the products. The sum output from each MAC cell during each cycle or iteration is provided to accumulator circuit 150. According to aspects of the subject technology, accumulator circuit 150 includes suitable logic, circuitry, and/or code to accumulate the sums provided by MAC cells 140 during the sequence of cycles or iterations to generate output feature elements of an output tensor representing the convolution of the input tensor with the kernel. Accumulator circuit 150 may include a buffer configured to store the output feature elements while they are being generated from the sums provided by MAC cells 140, and adders configured to add the sums received from MAC cells 140 to the appropriate output feature element stored in the buffer. Once the sequence of cycles or iterations is complete, accumulator circuit 150 may be configured to provide the generated output tensor to post processor 180 for further processing.

Figure 2:
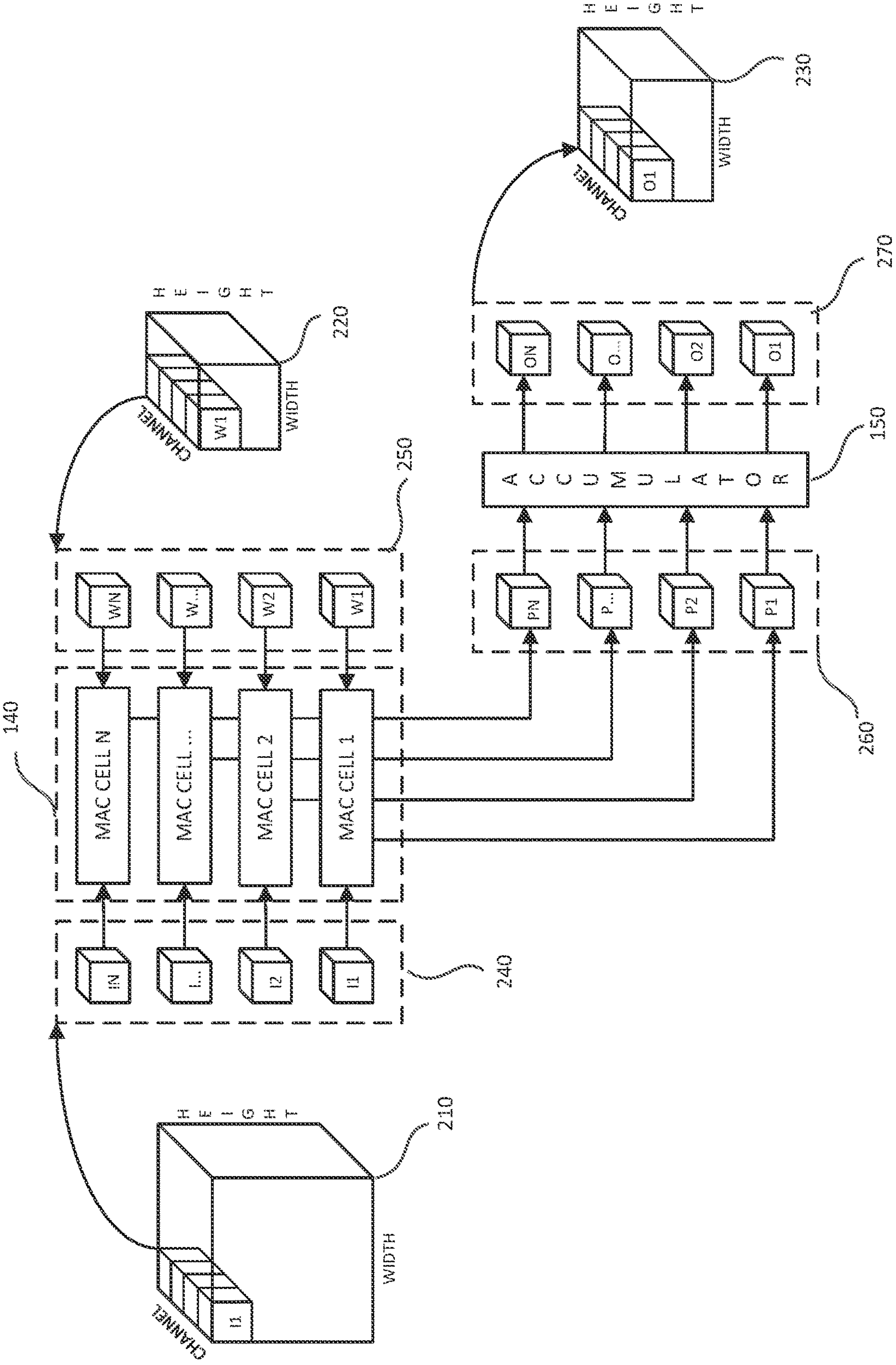
FIG. 2 is a block diagram illustrating aspects of a convolution operation according to aspects of the subject technology.

FIG. 2 is a block diagram illustrating aspects of a depthwise convolution operation according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

FIG. 2 illustrates aspects of a depthwise convolution in which input tensor 210 is convolved with kernel 220 to generate output tensor 230. According to aspects of the subject technology, input feature elements of input tensor 210 and weight elements of kernel 220 may be arranged in memory so that the elements are read out of memory along the channel axis. Accordingly, each input unit 240 may include one input feature element from each channel along the channel axis of the input tensor (e.g., input feature element I1-input feature element IN) and each weight unit 250 may include one weight element from each channel along the channel axis of the kernel (e.g., weight element W1-weight element WN). However, depthwise convolution convolves the input tensor with the kernel channel by channel, with the convolution of each channel being independent of the other channels. For each iteration or cycle of the depthwise convolution operation, the feature processor circuit may provide one input unit to MAC cells 140 with each MAC cell receiving one input feature element from a respective channel. Similarly, the weight processor circuit may provide one weight unit to MAC cells 140 with each MAC cell receiving one weight element from a respective channel.

Limiting the number of input feature elements and weight elements provided to each MAC cell to one element from each of the input unit and the weight unit because the products of input feature elements and weight elements from different channels are not summed together for a depthwise convolution operation. In this situation, partial sums 260 provided to accumulator 150 (e.g., partial sum P1-partial sum PN) from the respective MAC cells each include just the single product produced by each MAC cell multiplying the respective input feature element and the respective weight element. This increases the total number of cycles or iterations needed to provide all of the partial sums needed to be accumulated by accumulator circuit 150 to produce output feature elements 270 (e.g., output feature element O1-output feature element ON) of output tensor 230.

Figure 3:
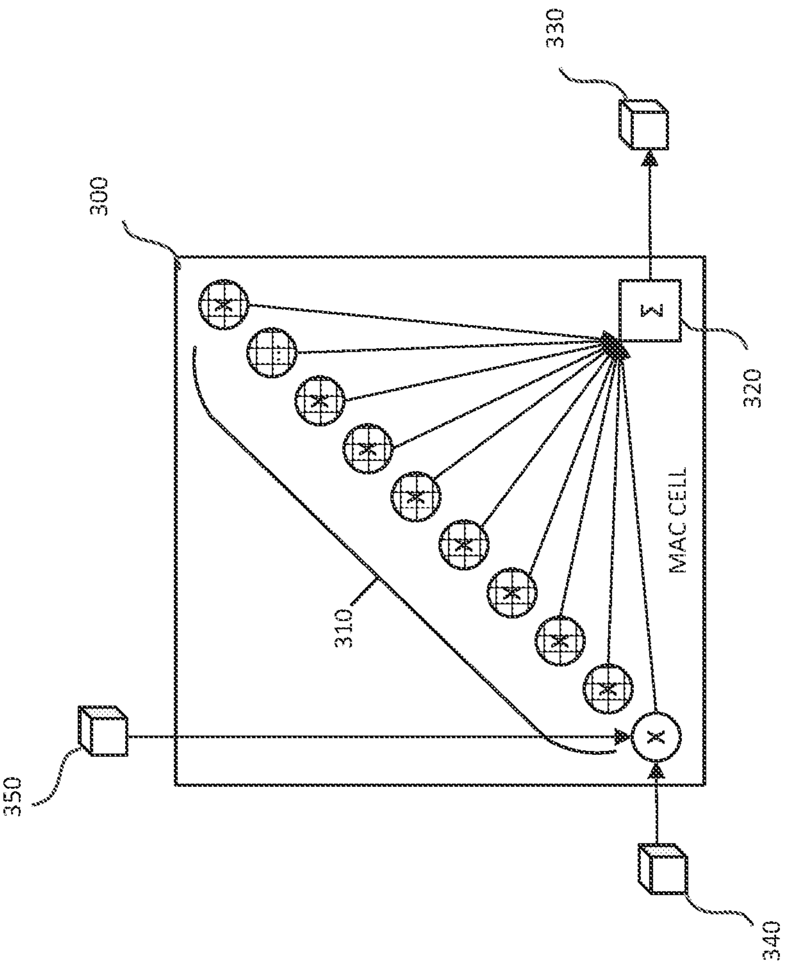

FIG. 3 is a block diagram depicting components of a MAC cell according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 3, MAC cell 300 includes a number of multiplier circuits 310 (e.g., 32 multiplier circuits) configured to multiply a value of an input feature element by a value of a weight element and provide the product to adder circuit 320. Adder circuit 320 is configured to sum the products from each of the multiplier circuits and output a partial sum 330. In the depthwise convolution situation described above, MAC cell 300 receives only one input feature element 340 and one weight element 350 to multiply using a single multiplier circuit represented by the non-hashed multiplier circuit of multiplier circuits 310. In this situation, all but one of the multiplier circuits is idle during each cycle or iteration of the depthwise convolution process and adder circuit 320 is not needed since partial sum 330 is simply the product of input feature element 340 and weight element 350. Accordingly, convolution hardware accelerator device/system 100 is inefficient in its use of resources when performing depthwise convolutions in this manner.

Figure 4:
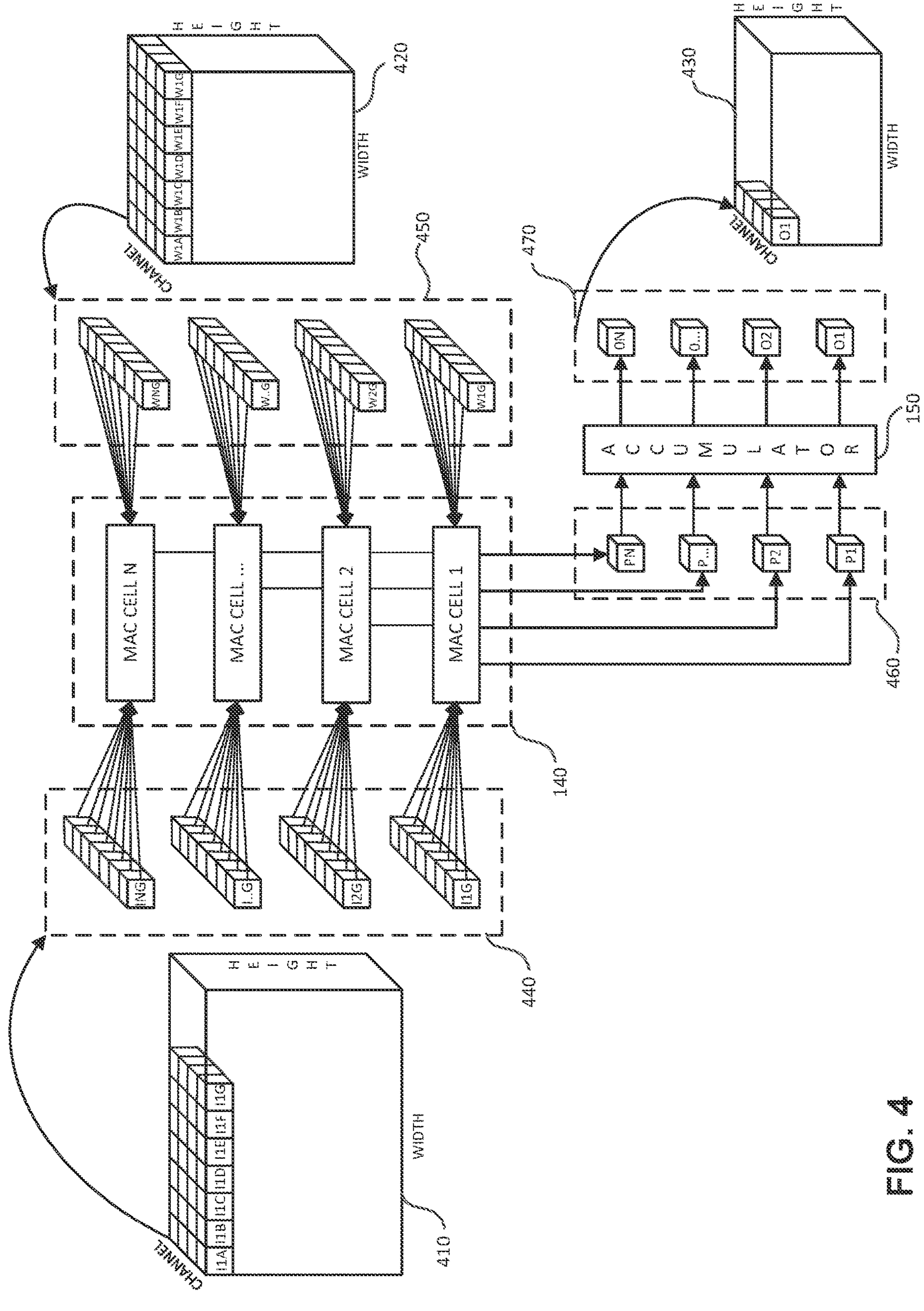
FIG. 4 is a block diagram illustrating aspects of a depthwise convolution operation according to aspects of the subject technology.

FIG. 4 is a block diagram illustrating aspects of a depthwise convolution operation according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

Similar to FIG. 2, FIG. 4 illustrates aspects of a performing a depthwise convolution to convolve input tensor 410 with kernel 420 to produce output tensor 430. As noted above, the input feature elements of the input tensor and the weight elements of the kernel are arranged in memory so that they are read out along the channel axis. Accordingly, each input unit read out from memory and provided to the feature processor circuit contains an input feature element from each of the channels and each weight unit read out from memory and provided to the weight processor circuit contains a weight element from each of the channels. However, in the example illustrated in FIG. 4, the feature processor circuit is configured to receive multiple input units from input tensor 410 in the memory and generate extended feature units 440 that each include a feature element from each of the received input units where all of the feature elements in one extended feature unit are from a common channel of the input tensor.

Similarly, the weight processor circuit is configured to receive multiple weight units from kernel 420 in the memory and generate extended weight units 450 that each include a weight element from each of the received weight units where all of the weight elements in one extended weight unit are from a common channel of the kernel. Once generated, extended feature units 440 and extended weight units 450 are provided to respective ones of MAC cells 140. Because all of the input feature elements provided to a respective MAC cell are from a common channel of input tensor 410 and all of the weight elements provided to the respective MAC cell are from a common channel of kernel 420, the products of multiplying the input feature elements with respective weight elements may be summed by the MAC cells and the sums (e.g., partial sum P1-partial sum PN) may be provided to accumulator circuit 150. Accumulator circuit 150 is configured to accumulate the partial sums from MAC cells 140 over a sequence of cycles or iterations and generate output feature elements 470 of the output tensor 430. After all of the output feature elements of output tensor 430 are generated by accumulator 150, output tensor 430 may be provided to the post processor circuit for further processing.

Figure 5:
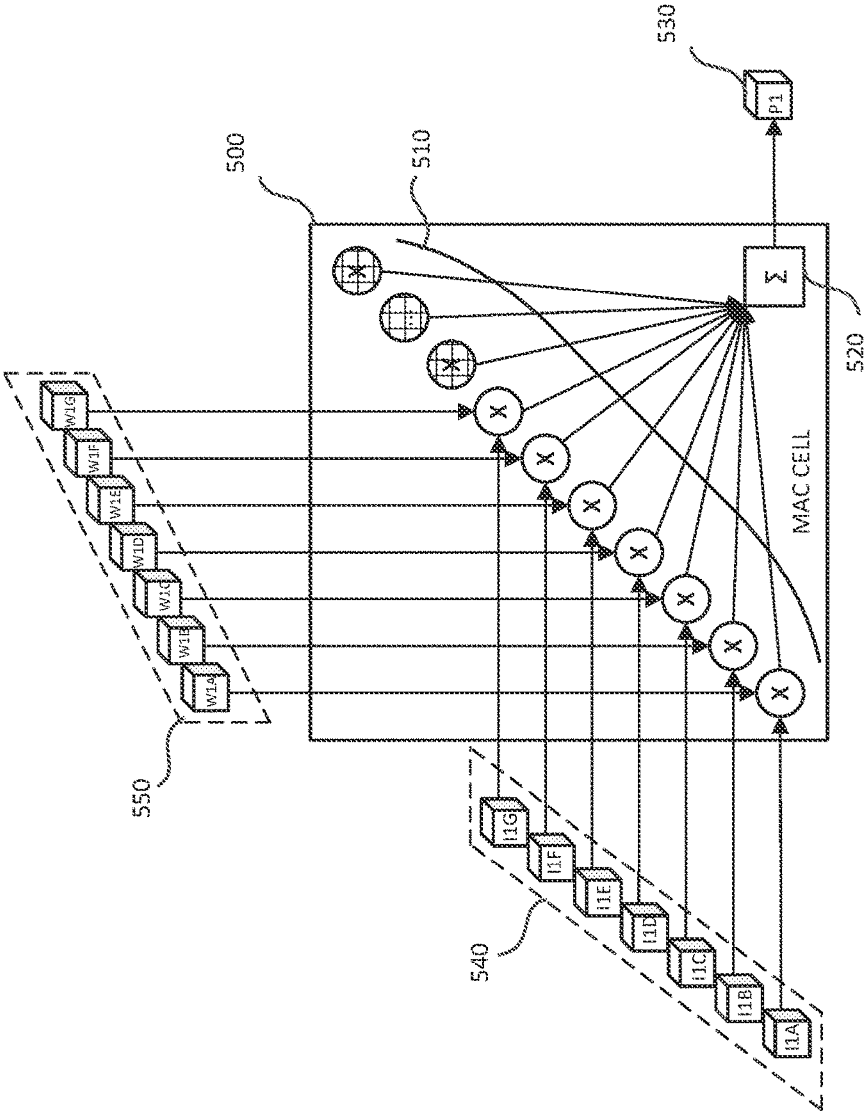
FIG. 5 is a block diagram depicting components of a MAC cell according to aspects of the subject technology.

FIG. 5 is a block diagram depicting components of a MAC cell according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 5, MAC cell 500 includes a number of multiplier circuits 510 (e.g., 32 multiplier circuits) configured to multiply a value of an input feature element by a value of a weight element and provide the product to adder circuit 520. Adder circuit 520 is configured to sum the products from each of the multiplier circuits and output a partial sum 530. As depicted in FIG. 5, MAC cell 500 receives extended feature unit 540, which include multiple input feature elements, and extended weight unit 550, which includes multiple weight elements, and multiplier circuits 510 multiple the input feature elements by respective weight elements. Multiplier circuits 510 are configured to provide the products from the multiplication operations to adder circuit 520, which sums the products to produce partial sum 530.

Comparing MAC cell 500 in FIG. 5 to MAC cell 300 in FIG. 3 illustrates an improvement in the utilization of the MAC cell resources during each cycle or iteration of a depthwise convolution operation. In particular, MAC cell 500 is able to use more than one multiplier circuit (e.g., seven) in each cycle or iteration since extended feature unit 540 including multiple input feature elements and extended weight unit 550 including multiple weight elements are provided to MAC cell 500 during each cycle or iteration. The number of multiplier circuits used during each cycle or iteration is based on the number of input feature elements in the extended feature unit and the number of weight elements in the extended weight unit. According to aspects of the subject technology, the number of weight elements included in each extended weight unit may be limited to the number of weight elements along the width axis of the kernel.

Figure 6:
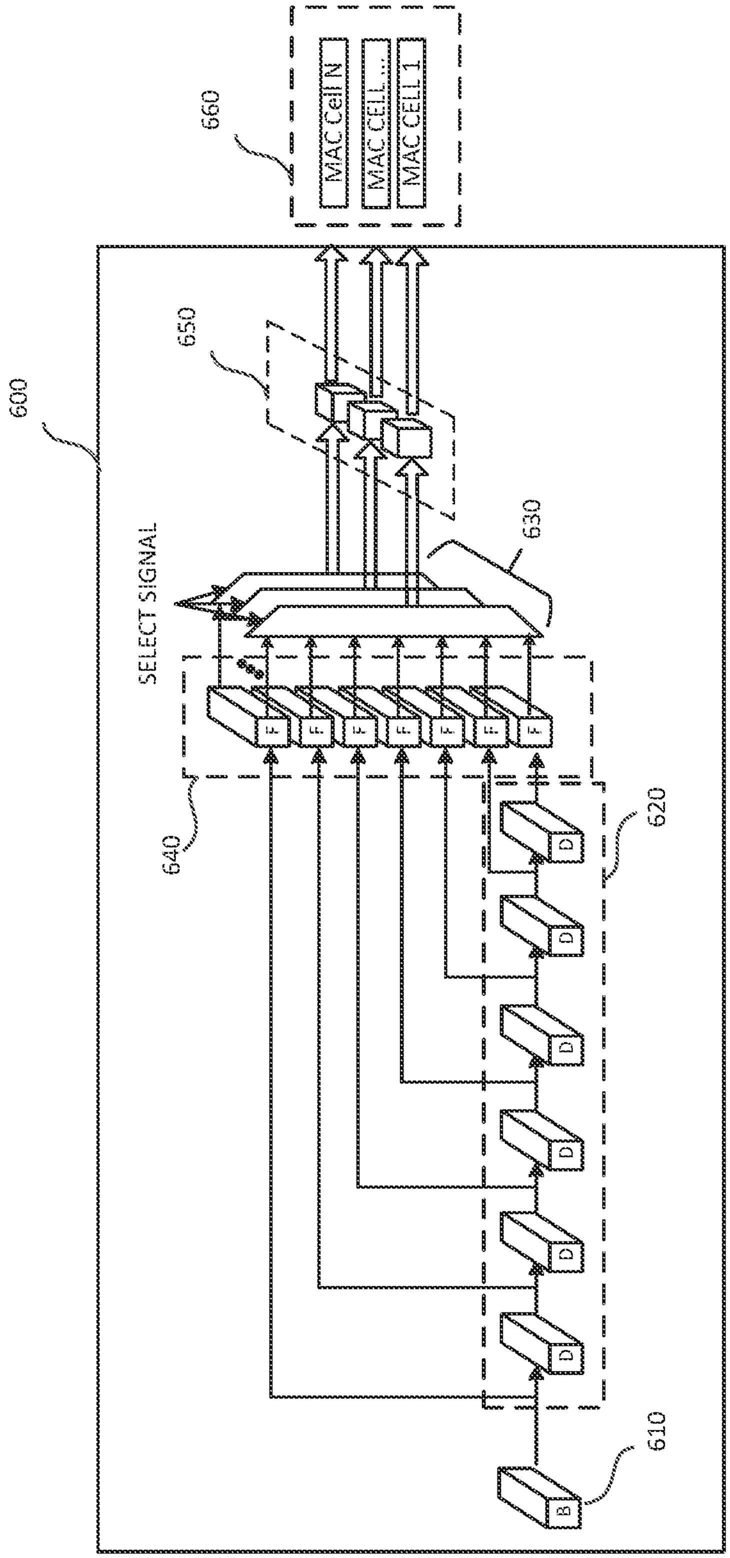
FIG. 6 is a block diagram illustrating components of a feature processor circuit according to aspects of the subject technology.

FIG. 6 is a block diagram illustrating components of feature processor circuit according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 6, feature processor circuit 600 includes input buffer 610, delay registers 620, and multiplexer circuits 630. Input buffer 610 is configured to receive an input unit from an input tensor read out of the memory. Input buffer 610 may be a first-in-first-out (FIFO) buffer configured to receive the input units from the memory. At each cycle or iteration, the input unit currently stored in input buffer 610 is written into a first delay register of delay registers 620 and a new input unit is stored in input buffer 610. Delay registers 620 are configured in a series where the outputs of one delay register are connected to the inputs of the next delay register in the series. At each cycle or iteration, any input units currently written in a respective delay register are shifted to a next delay register in the series. After a number of cycles or iterations (e.g., six), input buffer 610 and each of the delay registers 620 contain a respective input unit from the input tensor. The subject technology is not limited to any particular type or size of register and may implement the delay registers using individual flip-flops, latches, static random-access memory (SRAM) modules, etc.

According to aspects of the subject technology, multiplexer circuits 630 are configured to retrieve respective input feature elements from input units 640 stored in input buffer 610 and delay registers 620 to generate extended feature units 650 and provide the extended feature units to respective ones of MAC cells 660. The number of multiplexer circuits may correspond to the number of MAC cells, with each multiplexer circuit configured to provide an extended feature unit to a respective MAC cell.

The number of input feature elements to include in each extended feature unit by feature processor circuit 600 may be configurable. The maximum number of input feature elements to include in each extended feature unit may be limited by the circuit, such as the number of delay registers included in feature processor circuit 600. For situations where fewer input feature elements are desired for each extended feature unit, a select signal may be provided by the controller circuit to specify how many input units in the input buffer 610 and delay registers 620 are retrieved by multiplexer circuits 630 during each cycle or iteration. For example, the number of weight elements along the width axis of a kernel (e.g., three) may be smaller than the maximum number of input feature elements that can be included in each extended feature unit (e.g., seven). The select signal may specify how many and/or which of the input buffer 610 and delay registers 620 multiplexer circuits 630 should retrieve input feature elements.

Figure 7:
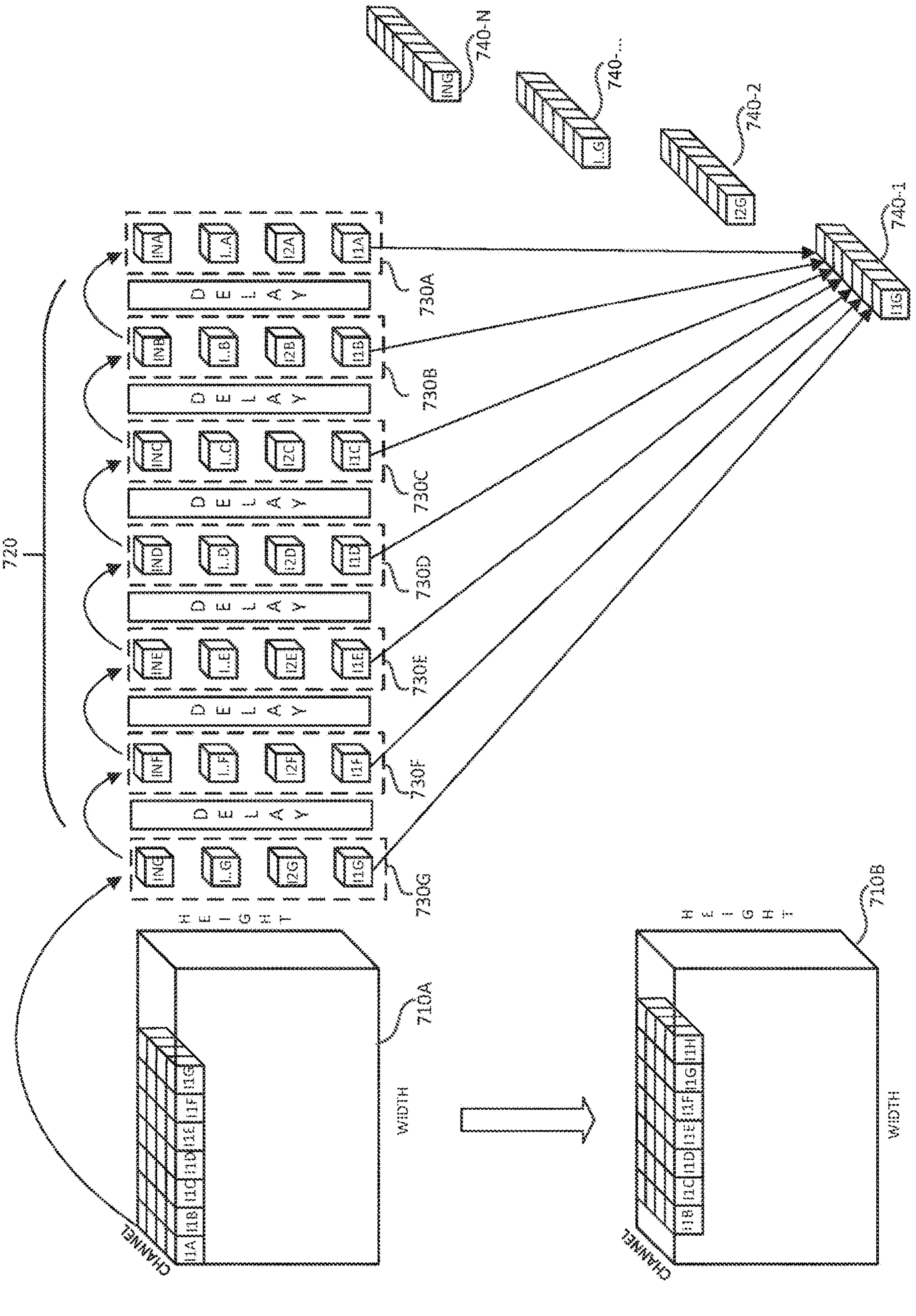
FIG. 7 is a block diagram illustrating the generation of extended feature units by a feature processor circuit according to aspects of the subject technology.

FIG. 7 is a block diagram illustrating the generation of extended feature units by feature processor circuit according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

FIG. 7 depicts input tensor 710A from which an input unit is read during each cycle or iteration of a sequence of cycles or iterations. For example, input unit 730A, which includes input feature elements I1A-INA, may be read from the memory and stored in an input buffer. On the next cycle or iteration, input unit 730B, which includes input feature elements I1B-INB, may be read from memory and stored in the input buffer, while input unit 730A is shifted to a first delay register. This process is repeated for input unit 730C, which includes input feature elements I1C-INC, through input unit 730G, which includes input feature elements I1G-ING. The delay incurred for each cycle or iteration is represented in FIG. 7 by the delay boxes 720, and the shifting of input units through the series of delay registers is represented by the arrows.

As noted above, multiplexer circuits may be configured to read out input feature elements from each of the input units to generate an extended feature unit, where the input feature elements in the extended feature unit all come from a common channel of the input tensor. For example, FIG. 7 depicts the generation of extended feature unit 740-1 using input feature elements I1A-I1G, which all come from a first channel of input tensor 710A. Similarly, extended feature unit 740-2 is generated using input feature elements 12A-12G, which all come from a second channel of input tensor 710A. Extended feature units 740-1 through 740-N are generated in this manner. Once generated, extended feature units 740-1 through 740-N are provided by the feature processor circuit to respective ones of the MAC cells.

In the example illustrated in FIG. 7, six cycles or iterations elapse before the first extended feature units are provided to the MAC cells for multiplication and accumulation. Once the first set of extended feature units are provided to the MAC cells, the number of cycles or iterations that elapse before the next set of extended feature units are provided to the MAC cells may vary depending on the stride value of the depthwise convolution being performed. For example, with a stride value of one, the next set of extended feature units may be provided at the next cycle or iteration. At the next cycle or iteration, another input unit that includes input feature elements I1H-INH is read from memory into the input buffer and the other previously stored input units are shifted through the series of delay registers resulting in dropping input unit 730A. Extended feature units are then generated by the multiplexer circuits from this next set of input units and are provided to the MAC cells. Input tensor 710B depicted in FIG. 7 represents the same input tensor as input tensor 710A just with the next set of input units highlighted.

If the stride value of the depthwise convolution operation is greater than one, the number of cycles or iterations before the next set of extended features units are provided to the MAC cells increases to match the stride value. For example, if the stride value is two, two cycles or iterations elapse before the next set of extended feature units are provided to the MAC cells. During the two cycles or iterations, two new input units are received from memory and the currently stored input units are shifted to the next delay register in the series of delay registers twice.

The weight processor circuit may be implemented and operated in the same manner described above in connection with FIGS. 6 and 7 for the feature processor circuit. However, according to aspects of the subject technology, the same set of extended weight units may be provided to the MAC cells to be multiplied and accumulated with different sets of extended feature units over multiple cycles or iterations. Accordingly, the weight processor circuit may be implemented using a different structure than that used for the feature processor circuit.

Figure 8:
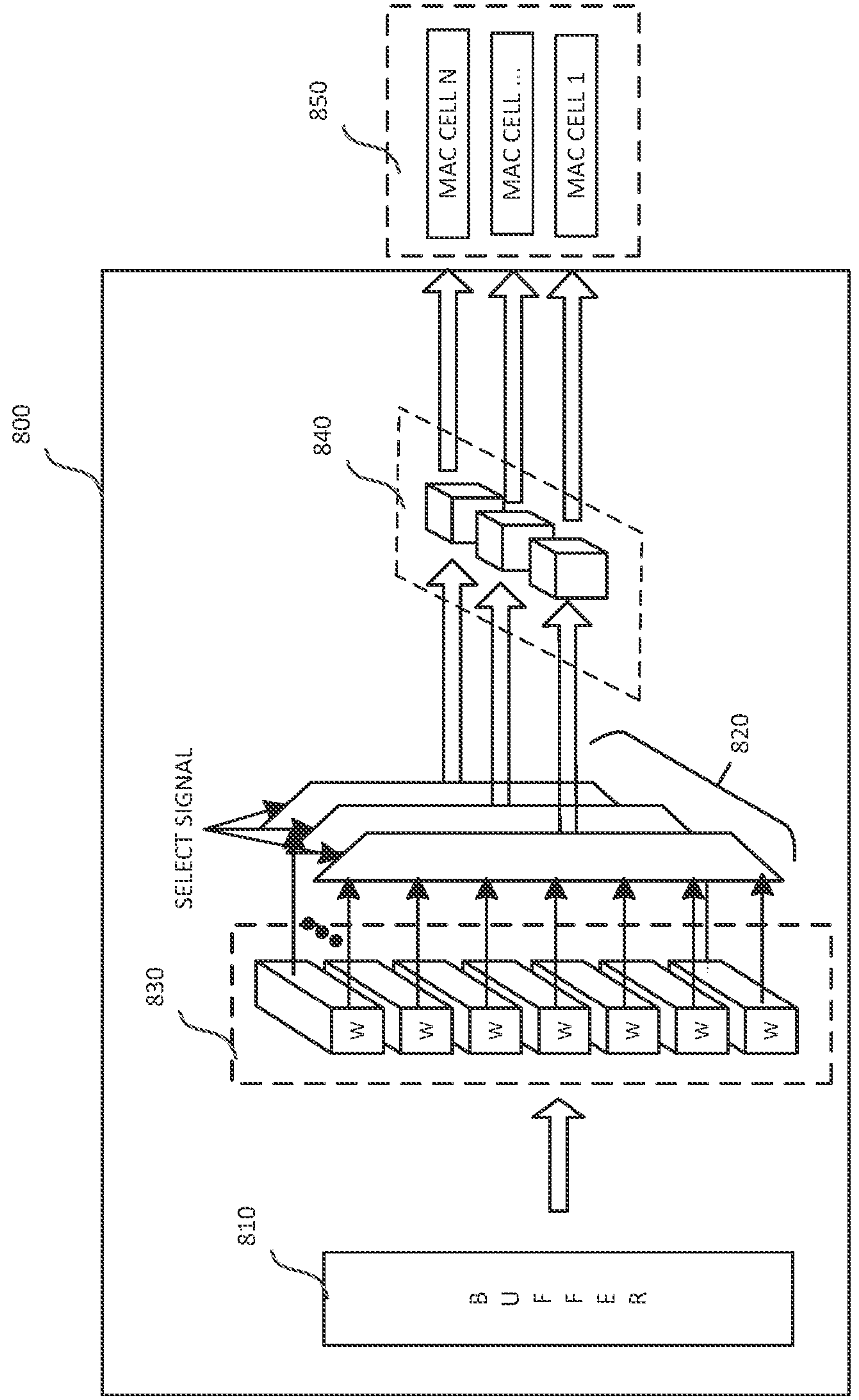
FIG. 8 is a block diagram illustrating components of a weight processor circuit according to aspects of the subject technology.

FIG. 8 is a block diagram illustrating components of the weight processor circuit according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 8, weight processor circuit 800 includes buffer 810 and multiplexer circuits 820. Buffer 810 may comprise a set of registers configured to receive and store weight units comprising weight elements of a kernel read out of memory. Initially, a new weight unit from the kernel may be written to the registers of buffer 810 during each cycle or iteration of a sequence of cycles or iterations. Once a predetermined number of weight units (e.g., seven) are written to buffer 810, multiplexer circuits 820 are configured to retrieve respective weight elements from weight elements 830 in buffer 810 to generate extended weight units 840 and provide the extended weight units to respective ones of MAC cells 850. The number of multiplexer circuits may correspond to the number of MAC cells, with each multiplexer circuit configured to provide an extended weight unit to a respective MAC cell.

As with the input feature elements, the number of weight elements to include in each extended weight unit by weight processor circuit 800 may be configurable. The maximum number of weight elements to include in each extended weight unit may be limited by the circuit, such as the number of registers in buffer 810. For situations where fewer weight elements are desired for each extended weight unit, a select signal may be provided by the controller circuit to specify how many weight elements from the weight units in input buffer 810 are retrieved by multiplexer circuits 820 during each cycle or iteration. For example, the number of weight elements may be reduced to match a number of input feature elements being included in each extended feature unit by the feature processor circuit. The select signal may specify how many weight units and/or from which weight units stored in buffer 810 multiplexer circuits 820 should retrieve weight elements to generate the extended weight units.

According to aspects of the subject technology, a set of extended weight units may be provided to the MAC cells multiple times during a sequence cycles or iterations to have their weight elements multiplied and accumulated with the input feature elements of multiple different sets of extended feature units. Buffer 810 may be configured as a double buffer, where a first portion of the double buffer may hold the set of weight units currently being used to generate the extended weight units provided to the MAC cells. A second portion of the double buffer may be configured to hold a next set of weight units that will be used to generate the extended weight units provided to the MAC cells after the weight elements of the weight units in the first portion of the buffer have been multiplied and accumulated with all of the input feature elements of the different sets of extended feature units relevant for the depthwise convolution operation. The next set of weight units may be written to the second portion of the double buffer during the cycles or iterations where the weight elements from the weight units in the first portion of the double buffer are being provided to the MAC cells.

Figure 9:
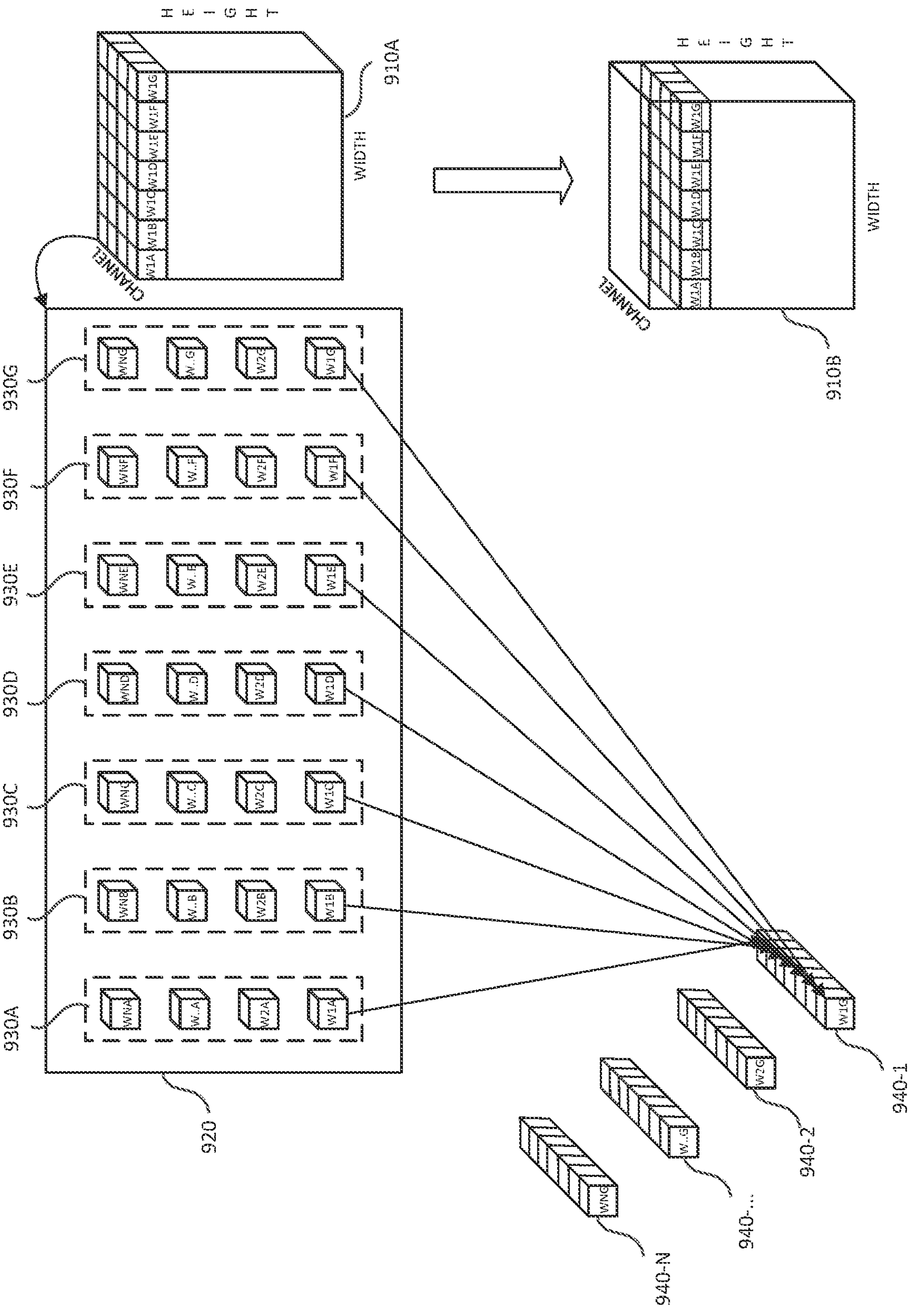
FIG. 9 is a block diagram illustrating the generation of extended weight units by a weight processor circuit according to aspects of the subject technology.

FIG. 9 is a block diagram illustrating the generation of extended weight units by weight processor circuit according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

FIG. 9 depicts kernel 910A from which a weight unit may be read during each cycle or iteration of a sequence of cycles or iterations. For example, weight unit 930A, which includes weight elements W1A-WNA, may be read from the memory and stored in buffer 920. On the next cycle or iteration, weight unit 930B, which includes weight elements W1B-WNB, may be read from memory and stored in buffer 920. This process may be repeated for weight unit 930C, which includes weight elements W1C-WNC, through weight unit 930G, which includes weight elements W1G-WNG.

As noted above, multiplexer circuits may be configured to read out weight elements from each of the weight units to generate an extended weight unit, where the weight elements in the extended weight unit all come from a common channel of the kernel. For example, FIG. 9 depicts the generation of extended weight unit 940-1 using weight elements W1A-W1G, which all come from a first channel of kernel 910A. Similarly, extended weight unit 940-2 is generated using weight elements W2A-W2G, which all come from a second channel kernel 910A. Extended weight units 940-1 through 940-N are generated in this manner. Once generated, extended weight units 940-1 through 940-N are provided by the weight processor circuit to respective ones of the MAC cells.

Once the current extended weight units 940-1 through 940-N have been provided to the MAC cells for multiplication and accumulation with all of the extended feature units relevant to the current depthwise convolution operation, the next set of extended weight units are provided to buffer 920 and used by the weight processor circuit to generate the next set of extended weight units. Kernel 910B depicted in FIG. 9 represents the same kernel as kernel 910A just with the next set of weight units highlighted.

Figure 10:
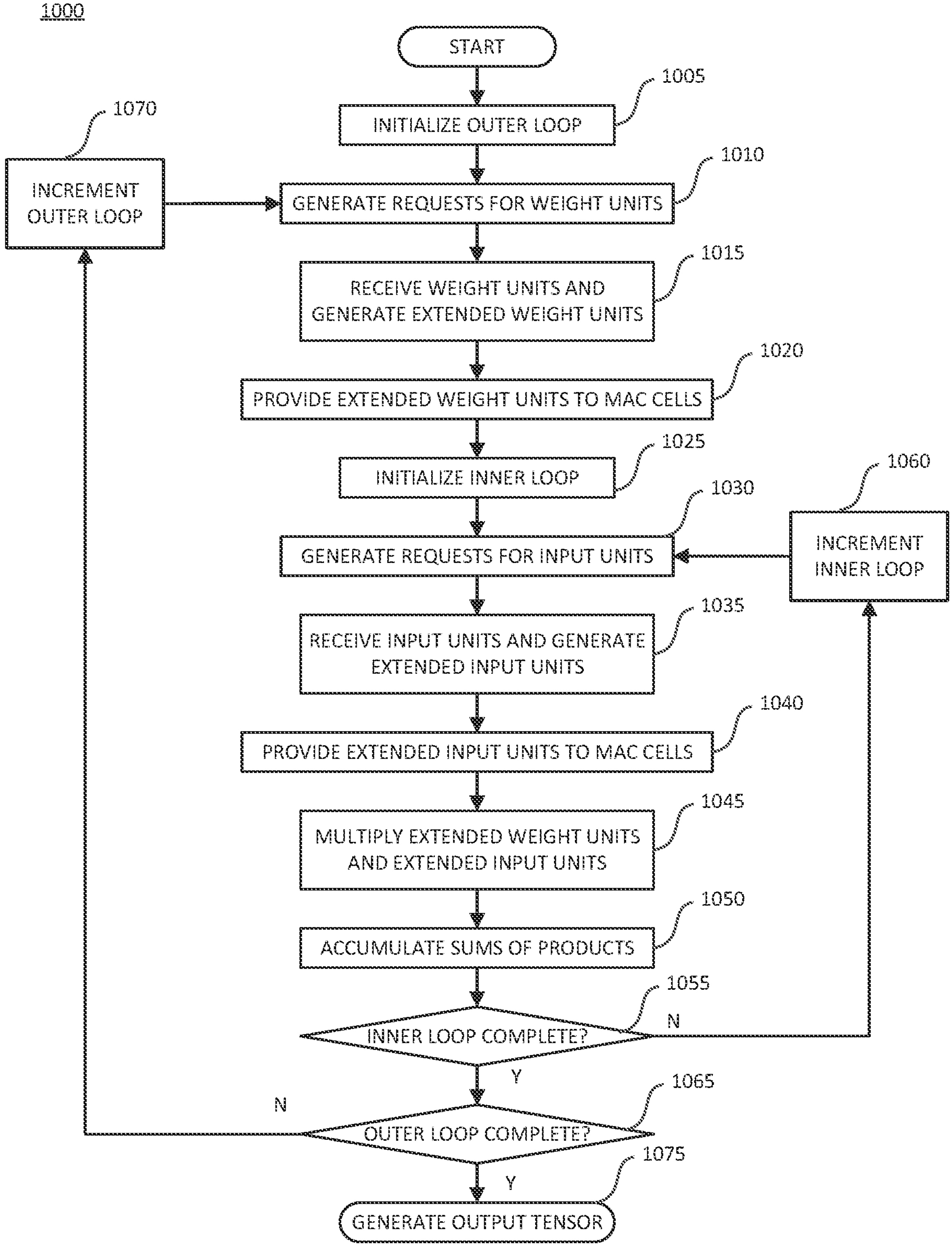
FIG. 10 is a flowchart illustrating an example depthwise convolution operation according to aspects of the subject technology.

FIG. 10 is a flowchart illustrating an example depthwise convolution operation according to aspects of the subject technology. For explanatory purposes, the blocks of process 1000 are described herein as occurring in serial, or linearly. However, multiple blocks of process 1000 may occur in parallel. In addition, the blocks of process 1000 need not be performed in the order shown and/or one or more blocks of process 1000 need not be performed and/or can be replaced by other operations.

Process 1000 may be initiated by a scheduler loading a first command in a command register for the controller circuit to parse. According to aspects of the subject technology, a depthwise convolution operation may be organized as an outer loop, which relates to the weight elements of the kernel, with a nested inner loop, which related to the input feature elements of the input tensor. The outer loop may be initialized (block 1005) by the controller circuit identifying the kernel and the first weight unit to be read from the kernel from the command. Once the kernel and the first weight unit from the kernel are identified, the controller circuit may generate requests for a set of weight units of the kernel to be read from memory starting with the first weight unit (block 1010). The requests may be sent to a DMA engine to process the requests and write the requested weight units from the memory into a buffer of the weight processor circuit. The process may stall here until all of the requests for the set of weight units have been sent.

When the set of weight units have been received and written to the buffer in the weight processor circuit, the weight elements of the weight units may be processed to generate a set of extended weight units, as described above (block 1015). Once generated, the set of extended weight units may be provided to the respective MAC cells (block 1020).

For each set of extended weight units generated and provided to the respective MAC cells by the weight processor circuit, multiple sets of extended feature units may be generated and provided to the respective MAC cells by the feature processor circuit. The inner loop of process 1000 is used to manage the generation of the multiple sets of extended feature units as well as the multiplication and accumulation of the input feature elements from each set of extended feature units with the weight elements of the current set of extended weight units. The inner loop may be initialized by the controller circuit identifying the input tensor and the location in memory of the first input unit of the input tensor needed to generate a set of extended feature units to be sent to the MAC cells (block 1025).

Once the input tensor and the location of the first input unit in memory have been identified, the controller circuit may start generating requests for input units to be read from the memory starting with the identified first input unit (block 1030). The requests may be sent to a DMA engine to process the requests and write the requested input units into a buffer of the feature processor circuit. The process may stall at this point until all of the requests for the current set of input units have been sent and all of the current set of input units have been provided to the feature processor circuit. Once all of the current set of input units have been received by the feature processor circuit, the feature elements of the input units are processed by the feature processor circuit to generate a set of extended feature units as described above (block 1035).

The set of extended feature units may be provided to the MAC cells (block 1040), where each MAC cell multiplies the feature elements from the extended feature unit provided to that MAC cell with the weight elements of the extended weight unit provided to that MAC cells, and the products of those multiplication operations are summed and provided to the accumulator circuit (block 1045). The accumulator circuit is configured to accumulate the sums of the products received from the MAC cells with respective values corresponding to output feature elements of an output tensor (block 1050). For example, the accumulator circuit may be configured to read out a value for an output feature element from a buffer, add a sum received from a MAC cell to that value, and return the updated value to the buffer. The output feature element may be identified based on the input feature elements and the weight elements multiplied by the MAC cell that provided the sum to the accumulator.

After all of the sums provided by the MAC cells have been accumulated by the accumulator circuit, the controller circuit may determine if the cycles or iterations of the current inner loop are complete (block 1055). For example, the controller circuit may determine if another set of extended feature units are to be multiplied with the current set of extended weight units as part of the depthwise convolution process. If another set of extended feature units are needed, the inner loop is incremented to the next set of input units that are needed to be received from the input tensor in memory (block 1060). The process then returns to the controller circuit generating requests for the next set of input units (block 1030).

As described above, the controller circuit may be configured to generate and send requests for input units to be provided to the feature processor circuit where one input unit is received by the feature processor circuit during a single cycle or iteration of the inner loop. If the stride value of the depthwise convolution operation is one, the controller circuit needs to generate just a single request for the next input unit to replace the oldest input unit currently in the feature processor circuit (block 1030). The feature processor circuit shifts the input units to add the next input unit to the set of input units and drop the oldest input unit from the set of input units. The feature processor circuit then processes the input features elements of the current set of input units to generate a set of extended feature units (block 1035), which are provided to respective MAC cells (block 1040) to be multiplied with the current set of extended weight units (block 1045) and the sums of the products from each of the MAC cells accumulated by the accumulator circuit (block 1050).

If all of the sets of extended feature units that need to be multiplied with the current set of extended weight units according to the depthwise convolution process have been generated and processed as described above, the current inner loop is considered to be complete (block 1055). The controller circuit may then determine if another set of extended weight units are required by the depthwise convolution process to determine if the current outer loop is complete (block 1065). If another set of extended weight units are required by the depthwise convolution process, the outer loop is incremented to the next set of weight units that are needed from the kernel (block 1070) and the controller circuit generates requests for the weight units (1010).

As described above, the buffer of the weight processor circuit may be a double buffer, where a first portion stores the current set of weight units being used in the outer loop and a second portion of the buffer stores the next set of weight units to be used in the next iteration of the outer loop. With this configuration, no requests for weight units are needed at the time of incrementing the outer loop and the weight processor circuit may transfer the next set of weight units from the second portion of the buffer to the first portion of the buffer and process the weight elements of the next set of weight units to generate the next set of extended weight units (block 1015) to be provided to the MAC cells (block 1020).

Along with generating the next set of extended weight elements, the inner loop of the depthwise convolution process is initialized by the controller circuit identifying the location of the input units that need to be requested from the input tensor in memory to generate the next set of extended feature units (block 1025). The depthwise convolution process then continues through the cycles or iterations of the inner loop for each set of extended feature units that are to be multiplied by the current set of extended weight units by the MAC cells in the manner described above.

If all of the extended weight units needed by the depthwise convolution process have been generated and processed as described above, the outer loop may be determined to be complete (block 1065). Upon completion of the outer loop, the accumulator circuit may be configured to generate and provide the output tensor comprising the output feature elements having the final accumulated values from the depthwise convolution process to the post processor for further processing (block 1075).

According to aspects of the subject technology, a device is provided that includes a plurality of multiplication and accumulation (MAC) cells, a feature processor circuit, and a weight processor circuit. The feature processor circuit is configured to receive a plurality of input units each comprising a plurality of input feature elements from different respective channels of an input tensor, generate a plurality of extended feature units each comprising an input feature element from each of the plurality of input units and from a common channel of the input tensor, and provide the plurality of extended feature units to respective MAC cells of the plurality of MAC cells. The weight processor circuit is configured to receive a plurality of weight units each comprising a plurality of weight elements from different respective channels of a kernel, generate a plurality of extended weight units each comprising a weight element from each of the plurality of weight units and from a common channel of the kernel, and provide the plurality of extended weight units to respective MAC cells of the plurality of MAC cells. Each MAC cell of the plurality of MAC cells is configured to multiply the input feature elements of the extended feature unit provided by the feature processor circuit by the respective weight elements of the extended weight unit provided by the weight processor circuit in parallel and output a sum of the products.

The device may further include a controller circuit configured to read a command from a command register, and generate requests for the plurality of input units and the plurality of weight units based on the command, where the plurality of input units and the plurality of weight units are provided to the feature processor circuit and the weight processor circuit from a memory in response to the requests. The controller circuit may be configured further to, for each iteration of an outer loop, generate one or more requests for a different plurality of weight units of the kernel, wherein the weight processor circuit is configured to generate and provide a different plurality of extended weight units to the plurality of MAC cells for each iteration of the outer loop, and, for each iteration of an inner loop within the outer loop, generate one or more requests for a different plurality of input units of the input tensor, wherein the feature processor circuit is configured to generate and provide a different plurality of extended feature units to the plurality of MAC cells for each iteration of the inner loop. The plurality of MAC cells may be configured to output the sums of the products for each iteration of the inner loop.

The device may further include an accumulator circuit configured to accumulate the sums of the products from the plurality of MAC cells for each iteration of the inner loop to generate an output tensor representing a depthwise convolution of the input tensor and the kernel.

The feature processor circuit may include an input buffer configured to receive the input units from the memory, a series of delay registers, each delay register having capacity to store one of the input units, and a plurality of multiplexer circuits corresponding to respective channels of the input tensor. For each iteration of the inner loop, the feature processor circuit may be configured further to write a next input unit from the input buffer into a first delay register in the series of delay registers, and shift input units currently written in a respective delay register in the series of delay registers to a next delay register in the series of delay registers. Each multiplexer circuit may be configured to provide a respective extended feature unit comprising a number of input feature elements from the series of delay registers to a respective MAC cell of the plurality of MAC cells.

For a first iteration of the inner loop, the feature processor circuit may be configured further to repeat the steps of writing a next input unit from the input buffer into the first delay register in the series of delay registers and shift input units currently written in the series of delay registers a number of times corresponding to the number of input feature elements included in an extended feature unit before the plurality of multiplexer circuits provide the extended feature units to the plurality of MAC cells.

For each iteration of the inner loop, the feature processor circuit may be configured further to perform the steps of writing a next input unit from the input buffer into the first delay register in the series of delay registers and shift input units currently written in the series of delay registers a predetermined number of times, wherein the predetermined number of times is based on a stride value of the depthwise convolution of the input tensor and the kernel.

The plurality of multiplexer circuits may be configured to each read the number of input feature elements from the series of delay registers based on a signal from the controller. The number of input feature elements maybe less than or equal to a width of the kernel.

The weight processor circuit may include an input buffer configured to receive the weight units from the memory, a series of delay registers, each delay register having capacity to store one of the weight units, and a plurality of multiplexer circuits corresponding to respective channels of the kernel. For each iteration of the outer loop, the weight processor circuit may be configured further to write a next weight unit from the input buffer into a first delay register in the series of delay registers, and shift weight units currently written in a respective delay register in the series of delay registers to a next delay register in the series of delay registers. Each multiplexer circuit may be configured to provide a respective extended weight unit comprising a number of weight elements from the series of delay registers to a respective MAC cell of the plurality of MAC cells. The plurality of multiplexer circuits may be configured to each read the number of weight elements from the series of delay registers based on a signal from the controller. The number of weight elements may be less than or equal to a width of the kernel.

The weight processor circuit may include a set of buffer registers configured to receive and store the weight units received from memory, and a plurality of multiplexer circuits corresponding to respective channels of the kernel, wherein each multiplexer circuit may be configured to provide a respective extended weight unit comprising a number of weight elements from the set of buffer registers to a respective MAC cell of the plurality of MAC cells. The plurality of multiplexer circuits may be configured to each read the number of weight elements from the set of buffer registers based on a signal from the controller, wherein the number of weight elements is less than or equal to a width of the kernel. A number of the channels of the input tensor may be equal to a number of channels of the kernel and a number of channels of the output tensor.

According to aspects of the subject technology, a system is provided that includes a plurality of multiplication and accumulation (MAC) cells, a feature processor circuit, a weight processor circuit, and a controller circuit. The controller circuit is configured to, for each iteration of an outer loop, generate one or more requests for a different plurality of weight units of a kernel. For each iteration of the outer loop, the weight processor circuit is configured to receive the different plurality of weight units each comprising a plurality of weight elements from different respective channels of a kernel, generate a plurality of extended weight units each comprising a weight element from each of the plurality of weight units and from a common channel of the kernel, and provide the plurality of extended weight units to respective MAC cells of the plurality of MAC cells. For each iteration of an inner loop within the outer loop, the controller circuit is configured to generate one or more requests for a different plurality of input units of an input tensor. For each iteration of the inner loop, the feature processor circuit is configured to receive the different plurality of input units each comprising a plurality of input feature elements from different respective channels of an input tensor, generate a plurality of extended feature units each comprising an input feature element from each of the plurality of input units and from a common channel of the input tensor, and provide the plurality of extended feature units to respective MAC cells of the plurality of MAC cells, wherein each MAC cell of the plurality of MAC cells is configured to multiply the input feature elements of the extended feature unit provided by the feature processor circuit by the respective weight elements of the extended weight unit provided by the weight processor circuit in parallel and output a sum of the products. The system further includes an accumulator circuit configured to accumulate the sums of the products output by the plurality of MAC cells for each iteration of the inner loop to generate an output tensor representing a depthwise convolution of the input tensor and the kernel.

The feature processor circuit may include an input buffer configured to receive the input units from the memory, a series of delay registers, each delay register having capacity to store one of the input units, and a plurality of multiplexer circuits corresponding to respective channels of the input tensor. For each iteration of the inner loop, the feature processor circuit may be configured further to write a next input unit from the input buffer into a first delay register in the series of delay registers, and shift input units currently written in a respective delay register in the series of delay registers to a next delay register in the series of delay registers. Each multiplexer circuit may be configured to provide a respective extended feature unit comprising a number of input feature elements from the series of delay registers to a respective MAC cell of the plurality of MAC cells.

For a first iteration of the inner loop, the feature processor circuit may be configured further to repeat the steps of writing a next input unit from the input buffer into the first delay register in the series of delay registers and shifting input units currently written in the series of delay registers a number of times corresponding to the number of input feature elements included in an extended feature unit before the plurality of multiplexer circuits provide the extended feature units to the plurality of MAC cells.

According to aspects of the subject technology, a method is provided that includes the steps of, for each iteration of an outer loop, generating one or more requests for a different plurality of weight units of a kernel, receiving the different plurality of weight units each comprising a plurality of weight elements from different respective channels of a kernel, generating a plurality of extended weight units each comprising a weight element from each of the plurality of weight units and from a common channel of the kernel, and providing the plurality of extended weight units to respective multiplication and accumulation (MAC) cells of a plurality of MAC cells. For each iteration of an inner loop within the outer loop, the method further includes generating one or more requests for a different plurality of input units of an input tensor, receiving the different plurality of input units each comprising a plurality of input feature elements from different respective channels of an input tensor, generating a plurality of extended feature units each comprising an input feature element from each of the plurality of input units and from a common channel of the input tensor, providing the plurality of extended feature units to respective MAC cells of the plurality of MAC cells, and multiplying, by each MAC cell, the input feature elements of the extended feature unit provided by the feature processor circuit by the respective weight elements of the extended weight unit provided by the weight processor circuit in parallel and outputting a sum of the products. The sums of the products output by the plurality of MAC cells are accumulated for each iteration of the inner loop to generate an output tensor representing a depthwise convolution of the input tensor and the kernel.

The method may further include, for a first iteration of the inner loop, repeating the steps of writing a next input unit from an input buffer into a first delay register in a series of delay registers and shifting input units currently written in the series of delay registers a number of times corresponding to a number of input feature elements included in an extended feature unit before providing the extended feature units to the plurality of MAC cells.

According to aspects of the subject technology, the electronic/semiconductor devices described above may be implemented as application specific integrated circuits (ASIC), field programmable gate arrays (FPGA), programmable logic devices (PLD), controllers, state machines, gated logic, discrete hardware components, or any other suitable devices or combination of devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The predicate words "configured to," "operable to," and "programmed to" do not imply any particular tangible or intangible modification of a subject but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

What is claimed is:

1. A device, comprising:

a plurality of multiplication and accumulation (MAC) cells;

a memory;

a feature processor circuit configured to:

receive a plurality of input units each comprising a plurality of input feature elements from different respective channels of an input tensor;

generate a plurality of extended feature units each comprising an input feature element from each of the plurality of input units and from a common channel of the input tensor; and provide the plurality of extended feature units to respective MAC cells of the plurality of MAC cells; and a weight processor circuit configured to:

receive a plurality of weight units each comprising a plurality of weight elements from different respective channels of a kernel;

generate a plurality of extended weight units each comprising a weight element from each of the plurality of weight units and from a common channel of the kernel; and provide the plurality of extended weight units to respective MAC cells of the plurality of MAC cells, wherein each MAC cell of the plurality of MAC cells is configured to multiply the input feature elements of the extended feature unit provided by the feature processor circuit by the respective weight elements of the extended weight unit provided by the weight processor circuit in parallel and output a sum of the products;

wherein the feature processor circuit comprises:

a first input buffer configured to receive the input units from the memory;

a first series of delay registers, each delay register having capacity to store one of the input units; and a first plurality of multiplexer circuits corresponding to respective channels of the input tensor.

2. The device of claim 1, further comprising:

a controller circuit configured to:

read a command from a command register; and generate requests for the plurality of input units and the plurality of weight units based on the command;

wherein the plurality of input units and the plurality of weight units are provided to the feature processor circuit and the weight processor circuit from the memory in response to the requests.

3. The device of claim 2, wherein:

the controller circuit is further configured to:

for each iteration of an outer loop, generate one or more requests for a different plurality of weight units of the kernel, wherein the weight processor circuit is configured to generate and provide a different plurality of extended weight units to the plurality of MAC cells for each iteration of the outer loop; and for each iteration of an inner loop within the outer loop, generate one or more requests for a different plurality of input units of the input tensor, wherein the feature processor circuit is configured to generate and provide a different plurality of extended feature units to the plurality of MAC cells for each iteration of the inner loop; and the plurality of MAC cells are configured to output the sums of the products for each iteration of the inner loop.

4. The device of claim 3, further comprising an accumulator circuit configured to accumulate the sums of the products output by the plurality of MAC cells for each iteration of the inner loop to generate an output tensor representing a depthwise convolution of the input tensor and the kernel.

5. The device of claim 4, wherein:

for each iteration of the inner loop, the feature processor circuit is further configured to:

write a next input unit from the first input buffer into a first delay register in the first series of delay registers; and shift input units currently written in a respective delay register in the first series of delay registers to a next delay register in the first series of delay registers;

wherein each multiplexer circuit is configured to provide a respective extended feature unit comprising a number of input feature elements from the first series of delay registers to a respective MAC cell of the plurality of MAC cells.

6. The device of claim 5, wherein for a first iteration of the inner loop, the feature processor circuit is further configured to:

repeat the steps of writing a next input unit from the first input buffer into the first delay register in the first series of delay registers and shift input units currently written in the first series of delay registers a number of times corresponding to the number of input feature elements included in an extended feature unit before the first plurality of multiplexer circuits provide the extended feature units to the plurality of MAC cells.

7. The device of claim 5, wherein for each iteration of the inner loop, the feature processor circuit is further configured to:

perform the steps of writing a next input unit from the first input buffer into the first delay register in the first series of delay registers and shift input units currently written in the first series of delay registers a predetermined number of times, wherein the predetermined number of times is based on a stride value of the depthwise convolution of the input tensor and the kernel.

8. The device of claim 5, wherein the first plurality of multiplexer circuits are configured to each read the number of input feature elements from the first series of delay registers based on a signal from the controller.

9. The device of claim 5, wherein the number of input feature elements is less than or equal to a width of the kernel.

10. The device of claim 4, wherein the weight processor circuit comprises:

a second input buffer configured to receive the weight units from the memory;

a second series of delay registers, each delay register having capacity to store one of the weight units; and a second plurality of multiplexer circuits corresponding to respective channels of the kernel, wherein for each iteration of the outer loop, the weight processor circuit is further configured to:

write a next weight unit from the second input buffer into a first delay register in the second series of delay registers; and shift weight units currently written in a respective delay register in the second series of delay registers to a next delay register in the second series of delay registers;

wherein each multiplexer circuit is configured to provide a respective extended weight unit comprising a number of weight elements from the second series of delay registers to a respective MAC cell of the plurality of MAC cells.

11. The device of claim 10, wherein the second plurality of multiplexer circuits are configured to each read the number of weight elements from the second series of delay registers based on a signal from the controller.

12. The device of claim 11, wherein the number of weight elements is less than or equal to a width of the kernel.

13. The device of claim 4, wherein the weight processor circuit comprises:

a set of buffer registers configured to receive and store the weight units received from memory; and a second plurality of multiplexer circuits corresponding to respective channels of the kernel, wherein each multiplexer circuit is configured to provide a respective extended weight unit comprising a number of weight elements from the set of buffer registers to a respective MAC cell of the plurality of MAC cells.

14. The device of claim 13, wherein the second plurality of multiplexer circuits are configured to each read the number of weight elements from the set of buffer registers based on a signal from the controller, wherein the number of weight elements is less than or equal to a width of the kernel.

15. The device of claim 4, wherein a number of the channels of the input tensor is equal to a number of channels of the kernel and a number of channels of the output tensor.

16. A system, comprising:
a plurality of multiplication and accumulation (MAC) cells;
a feature processor circuit;
a weight processor circuit; and
a controller circuit configured to:
for each iteration of an outer loop, generate one or more requests for a different plurality of weight units of a kernel, wherein for each iteration of the outer loop, the weight processor circuit is configured to:
receive the different plurality of weight units each comprising a plurality of weight elements from different respective channels of a kernel;
generate a plurality of extended weight units each comprising a weight element from each of the plurality of weight units and from a common channel of the kernel; and
provide the plurality of extended weight units to respective MAC cells of the plurality of MAC cells;
for each iteration of an inner loop within the outer loop, generate one or more requests for a different plurality of input units of an input tensor, wherein for each iteration of the inner loop, the feature processor circuit is configured to:
receive the different plurality of input units each comprising a plurality of input feature elements from different respective channels of an input tensor;
generate a plurality of extended feature units each comprising an input feature element from each of the plurality of input units and from a common channel of the input tensor; and
provide the plurality of extended feature units to respective MAC cells of the plurality of MAC cells, wherein each MAC cell of the plurality of MAC cells is configured to multiply the input feature elements of the extended feature unit provided by the feature processor circuit by the respective weight elements of the extended weight unit provided by the weight processor circuit in parallel and output a sum of the products; and
an accumulator circuit configured to accumulate the sums of the products output by the plurality of MAC cells for each iteration of the inner loop to generate an output tensor representing a depthwise convolution of the input tensor and the kernel;
wherein the feature processor circuit comprises:
a first input buffer configured to receive the input units from a memory;
a first series of delay registers, each delay register having capacity to store one of the input units; and
a first plurality of multiplexer circuits corresponding to respective channels of the input tensor, wherein for each iteration of the inner loop, the feature processor circuit is further configured to:
write a next input unit from the first input buffer into a first delay register in the first series of delay registers; and
shift input units currently written in a respective delay register in the first series of delay registers to a next delay register in the first series of delay registers;
wherein each multiplexer circuit is configured to provide a respective extended feature unit comprising a number of input feature elements from the first series of delay registers to a respective MAC cell of the plurality of MAC cells.

17. The system of claim 16, wherein the weight processor circuit comprises:
a second input buffer configured to receive the weight units from the memory;
a second series of delay registers, each delay register having capacity to store one of the weight units; and
a second plurality of multiplexer circuits corresponding to respective channels of the kernel, wherein for each iteration of the outer loop, the weight processor circuit is further configured to:
write a next weight unit from the second input buffer into a first delay register in the second series of delay registers; and
shift weight units currently written in a respective delay register in the second series of delay registers to a next delay register in the second series of delay registers;
wherein each multiplexer circuit is configured to provide a respective extended weight unit comprising a number of weight elements from the second series of delay registers to a respective MAC cell of the plurality of MAC cells.

18. The system of claim 16, wherein for a first iteration of the inner loop, the feature processor circuit is further configured to:
repeat the steps of writing a next input unit from the first input buffer into the first delay register in the first series of delay registers and shifting input units currently written in the first series of delay registers a number of times corresponding to the number of input feature elements included in an extended feature unit before the first plurality of multiplexer circuits provide the extended feature units to the plurality of MAC cells.

19. A method, comprising:
for each iteration of an outer loop:
generating one or more requests for a different plurality of weight units of a kernel;
receiving the different plurality of weight units each comprising a plurality of weight elements from different respective channels of a kernel;
generating a plurality of extended weight units each comprising a weight element from each of the plurality of weight units and from a common channel of the kernel; and
providing the plurality of extended weight units to respective multiplication and accumulation (MAC) cells of a plurality of MAC cells;
for each iteration of an inner loop within the outer loop:
generating one or more requests for a different plurality of input units of an input tensor;
receiving the different plurality of input units each comprising a plurality of input feature elements from different respective channels of an input tensor;
generating a plurality of extended feature units each comprising an input feature element from each of the plurality of input units and from a common channel of the input tensor;
providing the plurality of extended feature units to respective MAC cells of the plurality of MAC cells; and
multiplying, by each MAC cell, the input feature elements of the extended feature unit by the respective weight elements of the extended weight unit in parallel and outputting a sum of the products;

accumulating the sums of the products output by the plurality of MAC cells for each iteration of the inner loop to generate an output tensor representing a depthwise convolution of the input tensor and the kernel; and for a first iteration of the inner loop, repeating the steps of:

writing a next input unit from a first input buffer into a first delay register in a first series of delay registers; and shifting input units currently written in the first series of delay registers a number of times corresponding to a number of input feature elements included in an extended feature unit before providing the extended feature units to the plurality of MAC cells.

20. The method of claim 19, further comprising:

for each iteration of the outer loop:

writing a next weight unit from a second input buffer to a first delay register in a second series of delay registers; and shifting weight units currently written in a respective delay register in the second series of delay registers to a next delay register in the second series of delay registers; and providing, by each of a plurality of multiplexer circuits corresponding to respective channels of the kernel, a respective extended weight unit comprising a number of weight elements from the second series of delay registers to a respective MAC cell of the plurality of MAC cells.

* * * * *